(12) United States Patent
Cardona

(10) Patent No.: US 7,665,939 B1
(45) Date of Patent: Feb. 23, 2010

(54) RETRACTOR ANCHOR WITH TOP RELEASE

(75) Inventor: Edgardo Cardona, Walnutport, PA (US)

(73) Assignee: Sure_Lok, Inc.

( * ) Notice: Subject to any disclaimer, the term of this patent is extended or adjusted under 35 U.S.C. 154(b) by 413 days.

(21) Appl. No.: 11/502,887

(22) Filed: Aug. 10, 2006

(51) Int. Cl.
*B60P 7/08* (2006.01)
(52) U.S. Cl. .......................... 410/105; 410/104; 410/7; 410/8; 410/23; 410/11
(58) Field of Classification Search ......... 410/104–106, 410/110, 116, 7, 8, 23, 10–12; 244/118.1; 296/65.04; 24/115 K, 265 CD; 248/499, 248/503, 503.1
See application file for complete search history.

(56) References Cited

U.S. PATENT DOCUMENTS

| 4,047,689 A | 9/1977 | Grendahl |
| 4,496,271 A | 1/1985 | Spinosa et al. |
| 4,688,843 A | 8/1987 | Hall |
| 4,771,969 A | 9/1988 | Dowd |
| 4,850,769 A | 7/1989 | Matthews |
| 5,765,978 A | 6/1998 | Looker et al. |
| 5,871,318 A | 2/1999 | Dixon et al. |
| 6,287,060 B1 | 9/2001 | Girardin |
| 6,361,238 B1 | 3/2002 | Schittl et al. |
| 6,827,531 B2 * | 12/2004 | Womack et al. ............. 410/104 |
| 6,902,365 B1 | 6/2005 | Dowty |
| 6,918,722 B1 | 7/2005 | Girardin |

* cited by examiner

*Primary Examiner*—Stephen Gordon
(74) *Attorney, Agent, or Firm*—Young Basile

(57) ABSTRACT

A retractor anchor for releasably engaging a track. The retractor anchor has a body member which is slidably receivable on the track, and a plunger, which is moveably connected to the body member. A release member is connected to the plunger for moving the plunger between an engaged position, wherein the plunger engages the track to restrain the body member from sliding with respect to the track, and a disengaged position, wherein the body member is slidable with respect to the track. A mounting member is connected to the body member for mountably receiving an attachment for rotation of the attachment around the release member.

20 Claims, 3 Drawing Sheets

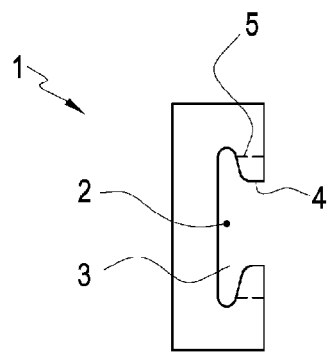
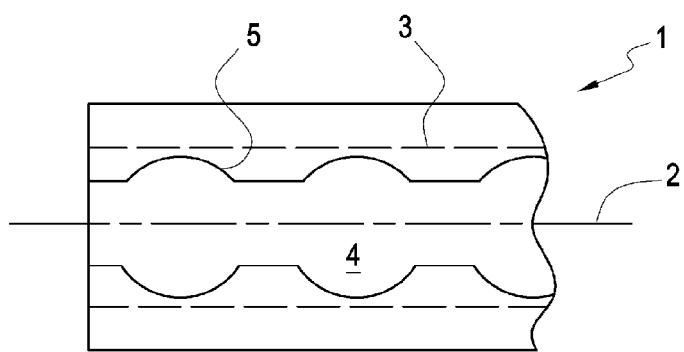
FIG. 2A
PRIOR ART
FIG. 2B
PRIOR ART
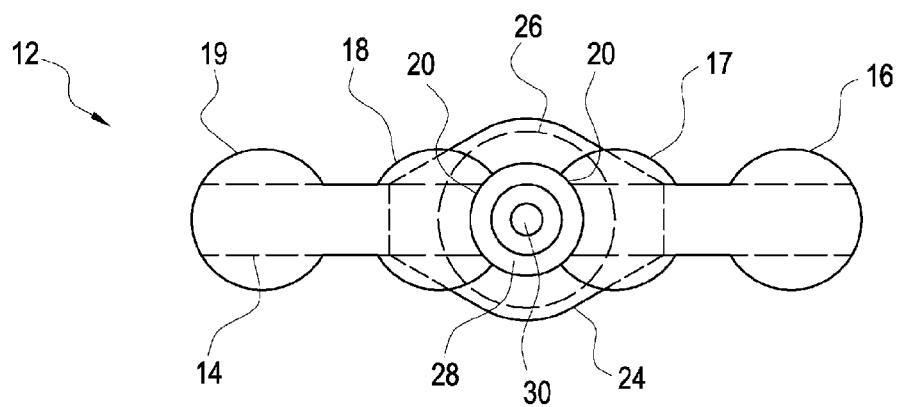
FIG. 3

RETRACTOR ANCHOR WITH TOP RELEASE

FIELD OF THE INVENTION

The present invention relates to the field of track fittings, and more particularly, the present invention relates to an anchor for releasably attaching a webbed belt retractor mechanism to a floor-mounted track or a wall-mounted track in a vehicle for restraining a wheelchair or the wheelchair occupant.

BACKGROUND OF THE INVENTION

Webbed belts are commonly used as passenger restraints in motor vehicles. It is also well known to restrain a wheelchair within a motor vehicle using a webbed belt. Furthermore, retractors are used to automatically retract the webbed belt when it is not in use. In certain applications, particularly in public transportation vehicles, it is often necessary to reconfigure the passenger compartment of the vehicle to address changing needs. For example, a bus or passenger train may include an area adaptable to accommodate either wheelchair-bound passengers or seated passengers. For this reason, public transportation vehicles often have a floor-mounted track for removably attaching wheelchair restraints as well as a wall-mounted track for removably attaching occupant restrain shoulder belts. In addition to allowing removal of the wheelchair restraints and occupant restraints, floor-mounted tracks and wall-mounted tracks also allow for flexible accommodation of one or several wheelchairs in the vehicle at any location where tracks are installed.

Among the various tracks that have been installed in vehicles for removably attaching wheelchair restrains and occupant restraints, a common design is referred to as L-track. L-track is substantially C-shaped in cross-section and has a channel that extends along the longitudinal axis of the track. So that retractor anchors may be placed into the channel, L-track includes a longitudinally extending slot formed through an upper surface of the track and in communication with the channel. In order to restrain a retractor anchor at a particular location along the L-track, a plurality of substantially cylindrical apertures extend through the upper surface of the track, spaced evenly along the slot. A variety of track fittings have been previously used to connect wheelchair restraint mechanisms to L-track. In order to allow some degree of flexibility in the position of the track fittings with respect to the wheelchair and occupant, many previously used track fittings have attempted to allow pivotal rotation of the retractor with respect to the track fitting. However, previous designs have been of limited utility, largely due to interference between the retractor and the release mechanism, which allows the track fitting to be removed from the track. In some designs, the release mechanism prevents 360° rotation of the retractor. In other designs, the retractor overlies the release mechanism at certain angular positions of the retractor, thereby impeding operation of the release mechanism.

It would be desirable to have a retractor anchor wherein the release mechanism does not interfere with rotation of the retractor, and wherein the release mechanism may be conveniently operated regardless of the angular orientation of the retractor with respect to the retractor anchor.

SUMMARY OF THE INVENTION

The present invention provides a retractor anchor for releasably engaging a track. The retractor anchor has a body member that is slidably receivable on the track, and a plunger that is engageable with the track. The retractor also has a release member for disengaging the plunger from the track, and a mounting member for mountably receiving an attachment.

The body member has a plurality of lugs for restraining the body member against removal from the track when the plunger is engaged with the track. The plunger has a longitudinal axis, along which the plunger is moveable with respect to the body member to selectively restrain the body member against sliding with respect to the track. The mounting member is connected to the body member so that it allows rotation of the attachment around the release member. The release member is connected to the plunger for moving the plunger between an engaged position, wherein the plunger engages the track to restrain the body member from sliding with respect to the track, and a disengaged position, wherein the body member is slidable with respect to the track.

The release member may extend through the mounting member, and may be coaxial with the mounting member. Furthermore, the release member is moveable along an axis that is parallel to the longitudinal axis of the plunger to thereby move the plunger between the engaged position and the disengaged position.

The release member may comprise a knob portion and a shaft portion. The knob portion is adjacent to the mounting member, and may be spaced from the body member by the mounting member. The shaft portion may extend through the mounting member to connect the plunger to the knob portion. Additionally, the shaft portion may extend through the attachment.

BRIEF DESCRIPTION OF THE DRAWINGS

The description herein makes reference to the accompanying drawings wherein like referenced numerals refer to like parts throughout several views and wherein:

FIG. 2A is a cross-sectional view of a section of L-track;

FIG. 2B is a top view of a section of L-track;

FIG. 3 is a bottom view of the body member of the retractor anchor of the present invention.

DESCRIPTION OF THE PREFERRED EMBODIMENT

Figure 1:
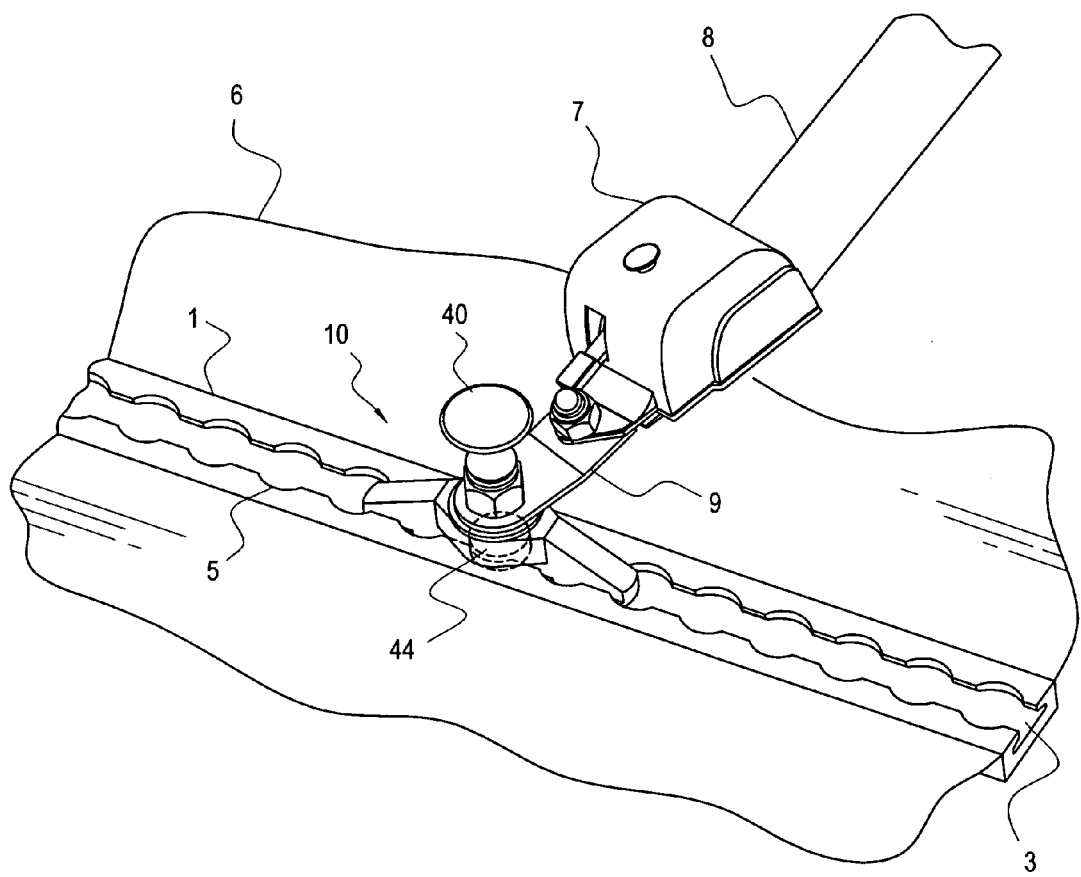
FIG. 1 is an illustration in perspective view showing the retractor anchor of the present invention securing a retractor with respect to a section of L-track.

Referring to the drawings, the present invention will now be described in detail with reference to the disclosed embodiment.

FIG. 1 shows a retractor anchor 10 of the present invention in engagement with a conventional floor track 1 installed in the floor 6 of a vehicle (not shown). The track 1 is commonly referred to as L-track, and although shown installed in the floor 6 of the vehicle, the track 1 could also be installed on the wall of a vehicle. As shown in FIGS. 2A-2B, the track 1 has a generally C-shaped cross-section which extends along a longitudinal axis 2. The interior of the C-shaped cross-section of the track 1 forms a channel 3 disposed within the track 1 and extending along the longitudinal axis 2 of the track 1. The channel 3 is in communication with a longitudinally extending slot 4 which is formed through the upper surface of the track 1. In order to provide a means for securing a fitting or anchor, such as the retractor anchor 10, at a particular location along the track 1, a plurality of substantially cylindrical apertures 5 are evenly spaced along the slot 4 and extend from the top surface of the track 1 to the channel 3, such that the apertures 4 are in communication with the channel 3 and the slot 4.

Figure 4:
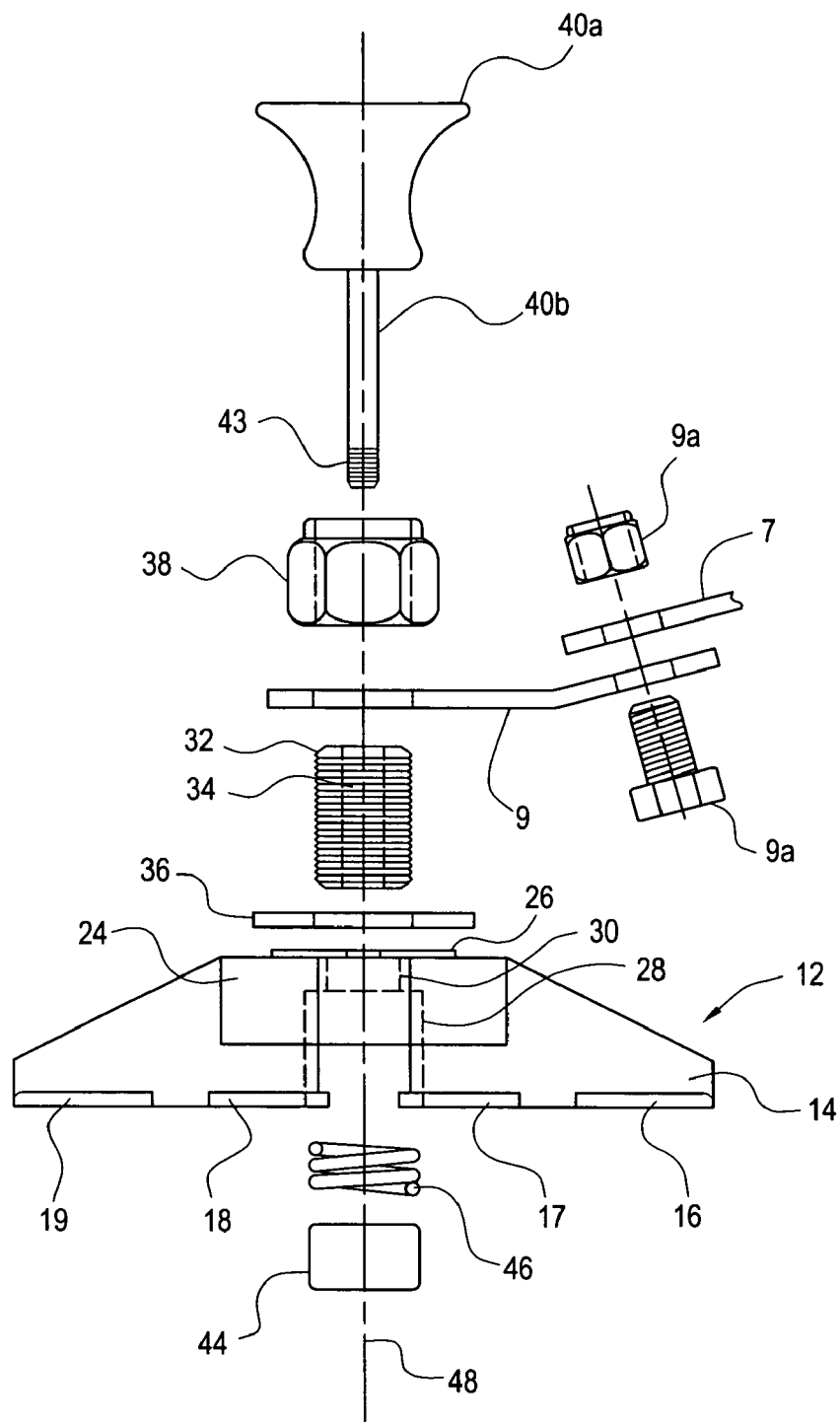
FIG. 4 is an exploded view of the retractor anchor of the present invention.

The retractor anchor 10 may be utilized for releasably mounting an attachment, such as a retractor 7 and an associated webbed belt 8, with respect to the vehicle. In order to allow removal of the retractor anchor 10 from the track 1, the retractor anchor 10 has a release member 40 for disengaging the retractor anchor 10 from the track 1. The retractor 7 is connected to the retractor anchor 10 by a mounting flange 9 which is mounted to the retractor anchor 10 to allow 360° rotation of the retractor 7 around the release member 40. The other main components of the retractor anchor 10, as shown in FIGS. 3-4, include a body member 12, which is slidably receivable on the track 1, a plunger 44 which is moveably connected to the body member 12 for selective engagement with the substantially cylindrical apertures 5 of the track 1, and a mounting member 32 for attaching the retractor 7 to the retractor anchor 10. The release member 40 is connected to the plunger 44 for moving the plunger 44 between an engaged position and a disengaged position. In the engaged position, the plunger 44 engages an aperture 5 on the track 1 to restrain the body member 12 of the retractor anchor 10 from sliding with respect to the track 1. In the disengaged position, the plunger 44 does not engage the track 1, and the body member 12 of the retractor anchor 10 may slide with respect to the track 1. In order to allow full understanding of the retractor anchor 10, these structures will be described in detail herein. It should be appreciated, however, that the particular design of these structures, and in particular the design of the body member 12, is largely dictated by the size and shape of the track 1, with which the retractor anchor 10 is to be used. Although the embodiment of the retractor 10 described herein is contemplated for use with conventional L-track, it is noted that the design of the retractor anchor 10 could be modified to allow use of the retractor anchor 10 with other types of track.

So that the retractor anchor 10 may engage the track 1, the body member 12 includes a flange portion 14 adapted to extend through the slot 4 of the track 1, as best seen in FIG. 3. In order to provide a stable base for the retractor anchor 10, and to at least partially restrain the body member 12 from moving with respect to the track 1, a plurality of lugs 16-19 are formed on the base of the flange portion 14. Each of the lugs 16-19 is formed of a pair of semi-cylindrical halves which extend transversely from opposing sides of the flange portion 14. Each of the lugs 16-19 is sized so that it may pass through any one of the plurality of substantially cylindrical apertures 5 of the track 1 to accommodate attachment and removal of the retractor anchor 10.

The plurality of lugs 16-19 includes a front outer lug 16, a front inner lug 17, a rear inner lug 18, and a rear outer lug 19, which are spaced along the flange portion 14 at distances corresponding to the spacing of the substantially cylindrical apertures 5 along the slot 4 of the track 1. It should be noted that although the retractor anchor 10 is described herein as having four lugs 16-19, it is specifically contemplated that the plurality of lugs comprise other numbers of lugs, such as two, six, or eight lugs 16-19. As will be described in detail herein, the plunger 44 is disposed within a substantially cylindrical cavity 28 formed in the body member 12 between a middle pair of the plurality of lugs 16-19. Accordingly, the front inner lug 17 and the rear inner lug 18 are not perfectly cylindrical, but rather, each includes a concave side 20, which is located adjacent to the substantially cylindrical cavity 28.

So that the plunger 44 may be moved between the engaged and disengaged positions by the release member, the substantially cylindrical cavity 28 is in communication with an aperture 30 through which the release member 40 may extend. The aperture 30 extends from the substantially cylindrical cavity 28 to a substantially cylindrical attachment base 26 formed on the top surface of the retractor anchor 10.

In order to accommodate the increased width of the substantially cylindrical cavity 28 as compared to the flange portion 14, a widened mid-portion 24 is formed on the body member 12 of the retractor anchor 10 in the area around the substantially cylindrical cavity 28. The widened mid-portion 24 extends outward from the flange portion 14 and is substantially diamond shaped when viewed from above. The widened mid-portion 24 further serves to stabilize the retractor anchor 10 with respect to the track 1, as it may engage the upper surface of the track 1 to resist tilting of the retractor anchor 10 with respect to the track 1.

As best seen in FIG. 4, the plunger 44 is disposed within the substantially cylindrical cavity 28 in the body member 12. In order to bias the plunger 44 toward the engaged position, a biasing member, such as a spring 46, may be disposed within the substantially cylindrical cavity 28 between the body member 12 and the plunger 44. Although the plunger 44 is shown and described herein as being substantially cylindrical, it should be noted that the plunger 44 could be formed in any shape operative to engage the apertures 5 of the track 1 with which the retractor anchor 10 is used.

In order to attach the retractor 7 for 360° rotation with respect to the release member 40, the substantially tubular mounting member 32 is connected to the body member 12 adjacent to the substantially cylindrical attachment base 26 and extends outward therefrom. So that the substantially tubular mounting member 32 may be connected to the body portion 12 of the retractor anchor 10, the exterior of the substantially tubular mounting member 32 may be threaded, or other suitable connection means may be employed. Furthermore, it is contemplated that the substantially tubular mounting member 32 could be formed integrally with the body member 12.

In order to connect the attachment 7 to the retractor anchor 10 for 360° rotation around the release member 40, the attachment flange 9 is seated over the substantially tubular mounting member 32. The attachment flange 9 is spaced from the substantially cylindrical attachment base 26 of the body member 12 by a bushing 36 in order to allow smooth, free rotation of the attachment flange 9 with respect to the body member 12. In order to hold the attachment flange 9 securely on the substantially tubular mounting member 32, a fastener 38, such as a nut is mounted on the substantially tubular mounting member 32 so that the attachment flange 9 is retained between the bushing 36 and the fastener 38. The attachment flange 9 may be substantially planar or may include an angle or bend as desired to the attachment 7 in a desired orientation. The attachment 7 can be connected to the attachment flange 9 by fasteners 9A, such as a nut and a bolt. It is also contemplated that an attachment 7, such as a retractor, could be mounted directly on the substantially tubular mounting member 32, thus eliminating the attachment flange 9. Furthermore, depending upon the particular application, the attachment flange 9 may be considered to be a portion of the retractor anchor 10, or the attachment flange 9 may be considered to be a portion of the attachment 7.

The release member 40 of the retractor anchor 10 has a knob portion 40a and a shaft portion 40b. The shaft portion 40b of the release member 40 extends through a passageway 34 formed in the substantially tubular mounting member 32 and through the aperture 30 in the body member 12. A connector 43 formed on the end of the shaft portion 40b of the release member 40 extends into the substantially cylindrical cavity 28 and is connected to the plunger 44. Thus, the knob portion 40a is connected to the plunger 44 by the shaft portion 40b to move the plunger 44 between the engaged position and the disengaged position. Furthermore, the knob portion 40a and shaft portion 40b of the release member 40, along with the substantially tubular mounting member 32 and the plunger 44 all extend along an axis 48. When the retractor anchor 10 is engaged with the track 1, the axis 48 extends substantially perpendicular to the longitudinal axis 2 of the track 1. In this regard, it should also be noted that the shaft portion 40b of the release member extends coaxially through the passageway 34 in the substantially tubular mounting member 32.

When the shaft portion 40b of the release member is seated within the passageway 34 of the substantially tubular mounting member 32, downward travel of the shaft portion 40b with respect to the substantially tubular mounting member 32 is limited by engagement of the knob portion 40a with the substantially tubular mounting member 32. In this regard, the release knob 40 is held spaced from the body member 12 of the retractor anchor 10 by the substantially tubular mounting member 32.

In use, an operator wishing to connect an attachment 7, such as a retractor, to a floor-mounted track 1 or a wall-mounted track 1 first connects the attachment 7 to the retractor anchor 10 either by using the attachment flange 9 and the fasteners 9A, or by connecting the attachment 7 directly to the mounting member 32 using the fastener 38.

In order to connect the body member 12 of the retractor anchor 10 to the track 1, the operator aligns the plurality of lugs 16-19 with a corresponding plurality of the substantially cylindrical apertures 5 in the track 1. When the lugs 16-19 and the apertures 5 are so aligned, the operator moves the lugs 16-19 through the apertures 5 and into the channel 3 of the track 1. Once this has been done, the flange portion 14 of the body member 12 extends through the slot 4 of the track 1.

It should be noted that when the lugs 16-19 pass through the apertures 5, the plunger 44 of the retractor anchor 10 is misaligned with respect to the cylindrical apertures 5. Thus, the plunger 44 engages the top surface of the track 1, causing the plunger 44 to move against the biasing force of the spring 46 from the engaged position to the disengaged position. Therefore, in order to lock the retractor anchor into engagement with the track 1, the operator slides the body member 12 with respect to the track 1 a distance equal to one-half the length of a cylindrical aperture 5. When the plunger 44 comes into alignment with a cylindrical aperture 5 in the track 1, the biasing force of the spring 46 moves the plunger 44 from the disengaged position to the engaged position. At this point, the lugs 16-19 are not aligned with the cylindrical apertures 5 in the track 1, thus retaining the retractor 10 on the track 1 through engagement of the lugs 16-19 with the channel 3. With the retractor anchor 10 locked into engagement with the track 1, the retractor 7 may be rotated fully around the substantially tubular mounting member 32 and thus around the release member 40 for 360° rotation, as desired.

When the operator wishes to remove the retractor anchor 10 from the track 1, the operator pulls the knob portion 40a of the release member 40, thereby moving the plunger 44 from the engaged position to the disengaged position. The operator then slides the body member 12 of the retractor anchor 10 a distance equal to that of one-half the length of a cylindrical aperture 5 of the track 1. This causes the lugs 16-19 to align with the cylindrical apertures 5 in the track 1. The operator then moves the lugs 16-19 through the apertures 5, thereby removing the retractor anchor 10 from the track 1.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is permitted under the law.

What is claimed is:

1. An anchor for releasably engaging a track, said track having a channel that extends along a longitudinal axis of said track, and said channel in communication with a longitudinally-extending slot formed through an upper surface of said track, wherein a plurality of substantially cylindrical apertures are spaced along said slot, said anchor comprising:
   a body member slidably receivable on said track, said body member having a plurality of lugs that are adapted to pass through said substantially cylindrical apertures of said slot for allowing said lugs to be disposed within said channel;
   a plunger moveably connected to said body member, said plunger receivable within an aperture of said plurality of substantially cylindrical apertures for engagement of said plunger with said track;
   a release member connected to said plunger for moving said plunger between an engaged position, wherein said plunger is in engagement with said track to restrain said body member from sliding with respect to said track and said lugs are in engagement with said track to restrain said body member against removal from said track, and a disengaged position, wherein said body member is slidable with respect to said track and said lugs are able to pass through said substantially cylindrical apertures in said track to allow removal of said body member from said track; and
   an attachment flange that is mounted for rotation completely around said release member without interference between said attachment flange and said release member.

2. The anchor stated in claim 1, further comprising:
   said attachment flange having a mounting hole formed therethrough; and
   said release member having a shaft portion, wherein said shaft portion extends through said mounting hole in said attachment flange.

3. The anchor stated in claim 1, further comprising:
   said attachment flange having a mounting hole formed therethrough; and
   said release member having a knob portion and a shaft portion that is connected to said knob portion and to said plunger, and said shaft portion extending through said mounting hole in said attachment flange such that said attachment flange is interposed between said knob portion of said release member and said body member.

4. The anchor stated in claim 1, further comprising:
   said plunger having a longitudinal axis, and said plunger moving from said engaged position to said disengaged position along said longitudinal axis; and
   said attachment flange is mounted for rotation about said longitudinal axis of said plunger within a plane that is substantially perpendicular to said longitudinal axis of said plunger.

5. The anchor stated in claim 1, wherein said release member is rigidly connected to said plunger.

6. The anchor stated in claim 1, further comprising:
an aperture that extends through said body member; and
said release member having a knob portion and a shaft portion, wherein said knob portion is connected to an upper end of said shaft portion, and said release member is connected to said plunger at a lower end of said shaft portion, wherein said shaft portion extends through said aperture in said body member, such that said knob portion of said release member is disposed above said body member aperture, said plunger is disposed below said body member aperture, and said attachment flange is interposed between said body member aperture and said knob portion.

7. The anchor stated in claim 1, further comprising:
a biasing element disposed between said plunger and said body member and engageable with said plunger to urge said plunger toward said engaged position.

8. The anchor stated in claim 1, wherein said attachment flange is rotatable with respect to said release member without causing rotation of said release member.

9. The anchor stated in claim 1, further comprising:
said attachment flange having a mounting hole formed therethrough, wherein at least a portion of said release member extends through said mounting hole in said attachment flange.

10. The anchor stated in claim 1, further comprising:
said attachment flange having a mounting hole formed therethrough; and
a mounting member connected to said body member, wherein said mounting member extends through said mounting hole of said attachment flange and engages said attachment flange adjacent to said mounting hole to guide rotation of said attachment flange.

11. An anchor for engaging a track, comprising:
a body member slidably receivable on said track;
a plurality of lugs connected to said body member to at least partially restrain movement of said body member with respect to said track;
a plunger moveably connected to said body member;
a release member for moving said plunger between an engaged position, wherein said plunger is in engagement with said track to restrain said body member from sliding with respect to said track, and a disengaged position, wherein said body member is slidable with respect to said track, said release member having a knob portion and a shaft portion, wherein said knob portion is disposed adjacent to said body member, and said shaft portion is connected to said mounting member to connect said knob portion and said plunger; and
an attachment flange that is disposed between said body member and said knob of said release member, wherein said attachment flange is mounted for rotation completely around said shaft portion of said release member without interference between said attachment flange and said release member.

12. The anchor stated in claim 11, further comprising:
said attachment flange having a mounting hole formed therethrough, wherein said shaft portion of said release member extends through said mounting hole in said attachment flange such that said attachment flange is disposed on said release member between said knob portion of said release member and said body member.

13. The anchor stated in claim 12, further comprising:
a biasing element disposed within a cavity and engageable with said plunger to urge said plunger toward said engaged position.

14. The anchor stated in claim 11, further comprising:
a cavity formed in said body member between a pair of said plurality of lugs, wherein said plunger is at least partially disposed within said cavity.

15. The anchor stated in claim 14, further comprising:
said body member having an aperture formed therethrough and extending from said cavity to a top surface of said body member, wherein said shaft portion extends through said aperture in said body member;
said attachment flange having a mounting hole formed therethrough; and
a mounting member that is substantially cylindrical, substantially tubular, and is connected to said body member, the mounting member defining an internal passageway that is in communication with said aperture of said body member such that said shaft portion of said release member extends through said mounting member, wherein said mounting member extends through said mounting hole of said attachment flange and engages said attachment flange adjacent to said mounting hole to guide rotation of said attachment flange.

16. An anchor for releasably engaging a track, said track having a channel that extends along a longitudinal axis of said track and said channel in communication with a longitudinally-extending slot formed through an upper surface of said track, wherein a plurality of substantially cylindrical apertures are spaced along said slot said anchor comprising:
a body member engageable with said track, said body member having a flange portion having a plurality of substantially cylindrical lugs, each said lug having a pair of opposed portions that extend transversely from opposing sides of said flange portion, wherein said lugs are adapted to pass through said substantially cylindrical apertures of said slot for allowing said lugs to be disposed within said channel, and for allowing said flange portion to extend through said slot;
a plunger having a longitudinal axis extending substantially perpendicular to said longitudinal axis of said track when said body member is engaged with said track, and said plunger moveable with respect to said body member along said longitudinal axis of said plunger;
a release member connected to said plunger for moving said plunger between an engaged position, wherein said plunger is in engagement with an aperture of said plurality of apertures to restrain said body member from sliding with respect to said track, and a disengaged position, wherein said body member is slidable with respect to said track, and said release member having a knob portion and a shaft portion for connecting said knob portion to said plunger; and
an attachment flange having a mounting hole formed therethrough, and said shaft portion of said release member extending through said mounting hole in said attachment flange such that said attachment flange is interposed between said knob portion of said release member and said body member to allow rotation of said attachment flange completely around said release member without interference between said attachment flange and said release member.

17. The anchor stated in claim 16, further comprising:
said plunger is positioned between a middle pair of said plurality of lugs.

18. The anchor stated in claim 17, further comprising:
said plunger is substantially cylindrical;
a substantially cylindrical cavity formed in said body member; and
said plunger is at least partially disposed within said substantially cylindrical cavity.

19. The anchor stated in claim 18, further comprising:
a biasing element disposed within said cavity and engageable with said plunger to urge said plunger toward said engaged position.

20. The anchor stated in claim 16, further comprising:
a mounting member connected to said body member, wherein said mounting member extends through said mounting hole of said attachment flange and engages said attachment flange adjacent to said mounting hole to guide rotation of said attachment flange.

\* \* \* \* \*